(12) United States Patent
Koslow et al.

(10) Patent No.: US 9,796,830 B2
(45) Date of Patent: Oct. 24, 2017

(54) HIGH DIELECTRIC COMPOSITIONS FOR PARTICLE FORMATION AND METHODS OF FORMING PARTICLES USING SAME

(71) Applicants: Evan Koslow, Dallas, TX (US); Jocelyn Tindale, Waterloo (CA); Chitral Angammana, Waterloo (CA); Tatiana Lazareva, Waterloo (CA); Angela Kim, Waterloo (CA); Ryan Gerakopulos, Waterloo (CA)

(72) Inventors: Evan Koslow, Dallas, TX (US); Jocelyn Tindale, Waterloo (CA); Chitral Angammana, Waterloo (CA); Tatiana Lazareva, Waterloo (CA); Angela Kim, Waterloo (CA); Ryan Gerakopulos, Waterloo (CA)

(73) Assignee: Gabae Technologies Inc., Dallas, TX (US)

( * ) Notice: Subject to any disclaimer, the term of this patent is extended or adjusted under 35 U.S.C. 154(b) by 185 days.

(21) Appl. No.: 14/052,079

(22) Filed: Oct. 11, 2013

(65) Prior Publication Data

US 2014/0103554 A1 Apr. 17, 2014

Related U.S. Application Data

(60) Provisional application No. 61/713,001, filed on Oct. 12, 2012.

(51) Int. Cl.
*C08K 5/41* (2006.01)
*D01F 1/02* (2006.01)
(Continued)

(52) U.S. Cl.
CPC ........ *C08K 5/41* (2013.01); *B01J 2/06* (2013.01); *C08J 3/14* (2013.01); *C08K 3/22* (2013.01);
(Continued)

(58) Field of Classification Search
None
See application file for complete search history.

(56) References Cited

U.S. PATENT DOCUMENTS 4,100,236 A 7/1978 Gordon et al.
4,554,335 A * 11/1985 Sakagami ............ C08F 214/18
361/317

(Continued)

FOREIGN PATENT DOCUMENTS

CN 102031586 A 4/2011
EP 0053242 A1 6/1982
(Continued)

OTHER PUBLICATIONS

Derwent Abstract of JP 59104911 A, 1990.*
Kuzel et al., Multi-component polymeric composites, Synthetic Metals 67 (1994) 255-261.
Dalton et al., Electrospinning of polymer melts: Phenomenological observations, Polymer 48 (2007) 6823-6833.
(Continued)

*Primary Examiner* — Nicole M Buie-Hatcher
(74) *Attorney, Agent, or Firm* — Phillips Lytle LLP; David L. Principe (57) ABSTRACT

A high dielectric composition for particle formation that includes a high dielectric solvent, and a high dielectric polymer dissolved into the high dielectric solvent. A method of forming particles including dissolving a high dielectric polymer in a high dielectric solvent to form a high dielectric composition, and dielectrophoretically spinning the high dielectric composition in an electrostatic field to form particles.

30 Claims, 3 Drawing Sheets (51) Int. Cl.
*C08K 3/22* (2006.01)
*C08K 5/06* (2006.01)
*C08K 5/07* (2006.01)
*C08K 5/101* (2006.01)
*D01D 5/00* (2006.01)
*B01J 2/06* (2006.01)
*C08J 3/14* (2006.01)
*C08L 101/12* (2006.01)

(52) U.S. Cl.
CPC .................. *C08K 5/06* (2013.01); *C08K 5/07* (2013.01); *C08K 5/101* (2013.01); *C08L 101/12* (2013.01); *D01D 5/003* (2013.01); *D01D 5/0061* (2013.01); *D01F 1/02* (2013.01)

(56) References Cited

U.S. PATENT DOCUMENTS

| | | | |
|---|---|---|---|
| 5,300,747 A | 4/1994 | Simon | |
| 6,162,752 A * | 12/2000 | Kawamoto | B82Y 30/00 252/62.3 BT |
| 7,498,082 B2 | 3/2009 | Ito et al. | |
| 7,901,610 B2 | 3/2011 | Joo et al. | |
| 2003/0215606 A1 | 11/2003 | Clancy et al. | |
| 2004/0119045 A1 | 6/2004 | Hata | |
| 2008/0242171 A1 | 10/2008 | Huang et al. | |
| 2009/0032475 A1 | 2/2009 | Ferrer et al. | |
| 2009/0130301 A1* | 5/2009 | Bahnmuller | D01D 5/0061 427/122 |
| 2009/0281224 A1* | 11/2009 | Koh | H01B 3/006 524/435 |
| 2010/0041804 A1* | 2/2010 | Brands | D01D 5/0023 524/221 |
| 2010/0181707 A1* | 7/2010 | Chao | H01B 1/08 264/465 |
| 2010/0202100 A1* | 8/2010 | Koh. | H01G 4/206 361/323 |
| 2012/0004370 A1 | 1/2012 | Scott et al. | |
| 2012/0056342 A1 | 3/2012 | Koslow | |
| 2013/0085212 A1* | 4/2013 | Lagaron Cabello | C08K 11/00 524/35 |
| 2014/0094551 A1 | 4/2014 | Koslow et al. | |
| 2014/0168857 A1 | 6/2014 | Sautter et al. | |

FOREIGN PATENT DOCUMENTS

| | | | |
|---|---|---|---|
| JP | 59104911 A * | 6/1984 | |
| JP | 04145145 A | 5/1992 | |
| JP | 2010121050 A | 6/2010 | |
| JP | 2010229563 A * | 10/2010 | |
| KR | 100871440 B1 | 11/2008 | |
| WO | 2006069205 A1 | 6/2006 | |
| WO | 2009127170 A2 | 10/2009 | |
| WO | 2009140381 A1 | 11/2009 | |
| WO | 2010023449 A1 | 3/2010 | |
| WO | 2010105329 A1 | 9/2010 | |
| WO | 2012013167 A2 | 2/2012 | |
| WO | 2012122485 A2 | 9/2012 | |

OTHER PUBLICATIONS

Zhou et al., The thermal effects on electrospinning of polylactic acid melts, Polymer 47 (2006) 7497-7505.
Melnik et al., Features of spinning of modified polypropylene fibres, Fibre Chemistry, vol. 40, No. 5, 2008.
Psarreas et al., Nitroxide-Mediated Controlled Degradation of Polypropylene, Polymer Engineering and Science—2007, 2118-2123.
Rangkupan et al., Electrospinning Process of Molten Polypropylene in Vacuum, Journal of Metals, Materials and Minerals. vol. 12 No. 2 pp. 81-87, 2003.
Scorah et al., Peroxide-Controlled degradation of polypropylene using a tetra-functional initiator, Polymer Engineering and Science—2009, 1760-1766.
Shin et al., Experimental characterization of electrospinning: the electrically forced jet and instabilities, Polymer 42 (2001) 9955-9967.
Warner et al., Cost effective nanofiber formation: Melt Electrospinning, National Textile Center Annual Report: Nov. 2006.
Kang et al., Effect of dysprosium oxide addition on the microstructure and dielectric properties of BaTiO3 Ceramics, Electronic Materials Letters, vol. 6, No. 4 (2010), pp. 145-149, Dec. 2010.
Agarwal et al., Determination of dielectric constant of stearic acid films using varying gap immersion method, Electrocomponent Science and Technology, 1977, vol. 4, pp. 23-28.
Kim et al., Microstructural evolution of electrically activated polypropylene/layered silicate nanocomposites investigated by in situ synchroton wide-angle X-ray scattering and dielectric relaxation analysis, Polymer 47 (2006) 5938-5945.
Erisken et al., A hybrid twin screw extrusion/electrospinning method to process nanoparticle-incorporated electrospun nanofibres, Nanotechnology 19 (2008) 165302 (8pp), Mar. 2008.
Lee et al., Highly oriented electrospun polycaprolactone micro/nanofibers prepared by a field-controllable electrode and rotating collector, Springer-Verlag, 2009.
Schneider, Optimizing mechanical properties of polypropylene fibers and nonwoven through a novel vis-breaking technology, Ciba Specialty Chemicals Inc., CH-4002 Basel, Switzerland.
Polyglycerols—General Overview, Solvay Chemicals, Bruxelles—Belgium, Sep. 2008.
Nayak et al., Characterisation of Polypropylene (PP) nanofibres fabricated by melt electrospinning and meltblowing, Symposium 5, Syntheses and Chemistry of Polymer Nanocomposites, Environmentally Friendly Materials and Polymer Recycling, Victoria, Australia.
Yee et al., Stress-induced structural changes in electrospun polyvinylidene difluoride nanofibers collected using a modified rotating disk, Polymer 49 (2008) 4196-4203.
Kariduranganavar et al., Using an additive to control the electrospinning of fibres of poly (e-caprolactone), Wiley Interscience, Mar. 2010.
Database Thompson Scientific, 2004.
DuPont Tedlar Polyvinyl Fluoride Film, Oct. 1995.
JP2010121050A, English Abstract.
Database WPI Week 200935 Thomason Scientific, London, GB; AN 009-F08014 XP002724827 & KR100871440B1, Amo Co Ltd, Dec. 3, 2008, Abstract.

* cited by examiner

HIGH DIELECTRIC COMPOSITIONS FOR PARTICLE FORMATION AND METHODS OF FORMING PARTICLES USING SAME

RELATED APPLICATIONS

This application claims the benefit of U.S. Provisional Patent Application Ser. No. 61/713,001, filed Oct. 12, 2012 and entitled "HIGH DIELECTRIC COMPOSITIONS FOR PARTICLE FORMATION AND METHODS OF FORMING PARTICLES USING SAME", the entire contents of which are hereby incorporated by reference herein for all purposes.

TECHNICAL FIELD

Embodiments herein relate generally to particle formation, and more particularly to high-dielectric compositions for particle formation, and methods of forming particles using such compositions.

SUMMARY OF SOME EMBODIMENTS

According to one aspect, a high dielectric composition for particle formation, comprising a high dielectric solvent, and a high dielectric polymer dissolved into the high dielectric solvent. The high dielectric composition of claim 1, further comprising a high dielectric additive.

In some embodiments, the high dielectric polymer has a dielectric constant of at least 5, of at least 8, or of between 10 and 12.

In some embodiments, the high dielectric solvent has a dielectric constant of at least 15, or of at least 40.

In some embodiments, the high dielectric additive has a dielectric constant of at least 50, or of at least 100, or of at least 1000.

In some embodiments, the polymer may include at least one of: PVDF; PVDF co- and ter-polymers; polyurethane; phenolic Kynar (PVDF); Tedlar PVF film; and vinylidene fluoride-trifluoroethylene copolymer; and polycaprolactone.

In some embodiments, the polymer concentration is between about 10 wt % and 25 wt %.

In some embodiments, the solvent includes dimethyl sulfoxide (DMSO).

In some embodiments, the solvent includes acetone.

In some embodiments, the solvent includes methyl-ethyl-ketone (MEK).

In some embodiments, the high dielectric additive includes at least one of: polyglycol; glycol; mannitol; ionic liquid; polyglycerol; glycerol; titanium dioxide; barium titanate; calcium copper titanate (CCTO) lanthanum strontium nickelate nanopowder; samarium oxides; samarium titanates; lanthanum oxides; lanthanum titanates; strontium oxide; strontium titanates; nanopowders of metal, bi-metal, and multi-metal oxides or titanates; metals; surface functionalized nanoparticles; metal nanoparticles with an organic coating; iron carbonyl; conjugated polymers; liquid crystals; and nano-particles of metals including one or more of nickel, silver, aluminum, gold, transition metals including manganese, cobalt, and alloys including stainless steel.

In some embodiments, the high dielectric additive is dispersed within the composition using a dispersing agent.

In some embodiments, the solvent includes at least one of: acetone; acetonitrile; acetophenone; acetyl chloride; acrylonitrile; gamma-butyrolectone; cyclohexanone; N,N-dimethylacetamide; N,N-dimethylformamide; dimethylsulfoxide; 1,4-Dioxane; ethylene glycol; ethyl formate; formamide; formic acid; methanol; methyl ethyl ketone; N-Methyl-2-pyrrolidone; nitromethane; 2-Nitropropane; propylene-1,2-carbonate; tetrahydrofuran; tetramethylurea; triethyl phosphate; and trimethyl phosphate.

According to another aspect, there is a method of forming particles comprising dissolving a high dielectric polymer in a high dielectric solvent to form a high dielectric composition, and dielectrophoretically spinning the high dielectric composition in an electrostatic field to form particles.

The method may further comprise adding a high dielectric additive to the high dielectric composition before the dielectrophoretic spinning.

The method may further comprise mechanically attenuating the high dielectric composition before the dielectrophoretic spinning to form pre-particles.

In some embodiments, the mechanical attenuation is performed using at least one of: at least one rotating disk; melt blowing; and one or more dispensing needles.

The method may further comprise heating at least one of the composition, the mechanical attenuation apparatus, and the surrounding ambient environment.

DETAILED DESCRIPTION

As discussed below, various experiments were conducted to examine the suitability of different compositions when forming particles, particularly sub-micronic polymer fibers.

In general, it has been discovered that, in a dielectrophoretic spinning process, compositions that included a high dielectric polymer (i.e., a polymer with a relatively high dielectric constant) dissolved in a high dielectric solvent (i.e., a solvent with a relatively high dielectric constant) seemed to be particularly good at generating particles of small size at good production rates. Furthermore, the presence of one or more high-dielectric additives within the polymer/solvent mixture also appeared beneficial.

In general, the term "particles" as used herein includes fibers (e.g., filaments, ligaments, etc.), droplets, and other shapes made from any suitable liquid and which may at least partially solidify, evaporate, and/or in some cases remain in liquid form.

"Electrospinning" as used conventionally refers to the production of particles (e.g., fibers or droplets) that are "spun" as fibers or "sprayed" as droplets by applying high electrostatic fields to one or more fluid spraying or spinning tips (also called emitters or spinnerets).

During electrospinning, the sprayed droplets or spun fibers are typically collected on a target substrate or collector plate positioned away from the emitters. A high voltage supply provides an electrostatic potential difference (and hence the electrostatic field) between the emitter (usually at a high voltage) and the target substrate (usually grounded).

It is often desirable to produce particles of very small sizes, particularly particles having a diameter less than 1 micrometer (i.e., sub-micronic fibers), since such particles can be commercially quite valuable. Theoretically this should be possible with known electrospinning processes based on results that have been achieved in a laboratory environment. However, in practice scaling up an electrospinning process beyond the laboratory has proven to be problematic, particularly when trying to produce large quantities of very small particles.

Scott et al. in US Patent Application Publication No. 2012/0004370 describe the use of a low dielectric constant polymer dissolved in a low dielectric constant solvent. The low dielectric constant solvent is supplemented with high dielectric additives to create a mixture with an overall high dielectric contrast (i.e., the ratio of the dielectric constants of the solvent and additives to the polymer). These high contrast mixtures display relatively good fiber formation when emitted into a strong electric field. The mixtures generally had a low conductivity that was below the range of conductivity normally associated with electrospinning. However, while the rates of fiber production seem high by conventional standards, they were still low when compared to desired commercial production rates.

The teachings herein are generally directed at techniques that may be useful for increasing particle production rates or reducing particle sizes, or both.

A phenomenon called dielectrophoretic spinning (or "D-spinning") is discussed, which generally refers to a process in which the properties of a composition (particularly its dielectric properties) are selected to encourage the formation of very small particles through "dielectrophoretic attenuation", namely by action of the dielectrophoretic forces acting on the composition (and which are generally unrelated to the conductivity of the composition). In some cases, dielectrophoretic spinning may be improved where the conductivity of the composition is low, as this may enhance the power available for dielectrophoretic forces.

It has been discovered that dielectrophoretic spinning can generate relatively small particles at relatively large production rates when the composition includes a polymer with a high dielectric constant dissolved into a solvent that has a high dielectric constant (sometimes in the presence of high dielectric additives). In general, the dielectric constant of the solvent is higher than the dielectric constant of the polymer, while the dielectric constant of the additives may be even higher (in some cases quite substantially).

The resulting composition that includes high dielectric constituent parts is referred to as a "high dielectric composition" and is believed to be particularly suitable for forming large quantities of small particles, particularly sub-micronic polymer fibers.

During a dielectrophoretic spinning process, it is desirable that the solvent be removed such that the finished polymer particles are normally substantially free of solvent. The mechanism for solvent removal is believed to be related to the ratio of the dielectric constants of the polymer and solvent as amended by any additives (also called the dielectric contrast).

Generally, it is understood that the dielectrophoretic forces acting upon an object increase by the square of the magnitude of the electric field and in direct proportion to the dielectric constant of the object minus one.

Scott et al. have previously shown it may be convenient to have a large dielectric contrast to encourage solvent separation. Specifically, Scott et al. describe low dielectric constant polymers dissolved in low dielectric constant solvents that have been enhanced with high dielectric additives. The resulting high dielectric contrast can help drive physical separation of the solvent from the polymer due to differences in the dielectrophoretic forces acting on the different constituent parts. Scott et al. refer to this process as "solvent ejection".

However, it has now been determined that the approach of Scott et al. may not be suitable when trying to generate large quantities of small particles.

According to the present teachings, high dielectric compositions for particle formation include polymers, solvents and in some cases additives that all have high dielectric constants (in some cases progressively higher), and in which the composition has a relatively low dielectric contrast.

In such high dielectric compositions with low dielectric contrasts, the separation of solvent and polymer may be less efficient because the dielectrophoretic forces acting on both solvent and polymer are similar. As a result, solvent separation appears to be driven by evaporation rather than by solvent ejection (or some other alternative mechanism).

Nevertheless, the use of high dielectric compositions can result in higher production rates as compared to previous approaches. In particular, in some cases production rates may be five, fifty or even many more times as high as known electrospinning processes.

In general, the rate of fiber production is believed to be roughly proportional to the dielectric constant of the polymer, while the size of the particles may be driven downward in proportion to the dielectric constant of the solvent due to the increased dielectrophoretic forces that are operable. Thus, higher dielectric polymers and solvents may be well suited to particle formation.

In some exemplary embodiments, the dielectric constant of the solvent is greater than the dielectric constant of the polymer. In some specific embodiments, the dielectric constant of the solvent is significantly higher than the dielectric constant of the polymer (e.g., two or more times greater).

In some embodiments, one or more high dielectric additives can be included within a solvent/polymer composition to further enhance the total effective dielectric constant of the composition. In some such embodiments, the dielectric additives may have dielectric constants many times higher than the dielectric constants of either the solvent or the polymer, or both. In some specific instances, the dielectric constant of the additives may be above 100, 1000, 10,000, or even above 100,000.

In some embodiments, the solvent may include one or more of the following solvents: acetone, acetonitrile, acetophenone, acetyl chloride, acrylonitrile, gamma-butyrolectone, cyclohexanone, N,N-dimethylacetamide, N,N-dimethylformamide, dimethylsulfoxide, 1,4-Dioxane, ethylene glycol, ethyl formate, formamide, formic acid, methanol, methyl ethyl ketone, N-Methyl-2-pyrrolidone, nitromethane, 2-Nitropropane, propylene-1,2-carbonate, tetrahydrofuran, tetramethylurea, triethyl phosphate, and trimethyl phosphate. In general these solvents have a high dielectric constant, and/or dissolve or swell particular polymers (e.g., PVDF) at elevated temperatures.

In some embodiments, a high dielectric composition may not include any low dielectric components whatsoever. Such compositions may allow for production rates that are as much higher (e.g., fifty times or more) than known technologies.

For example, the use of high dielectric compositions may yield sub-micronic fibers of very small diameter at rates of roughly 300-400 grams per minute per linear meter of beam. Whereas traditional solvent-based electrospinning from a needle typically operates at flow rates of about 0.1 milliliters per hour, a dielectrophoretic system in the same geometry according to the teachings herein might flow at up to 40 milliliters per hour and produce up to 6 grams per hour of dry 150-250 nanometer fiber (i.e. up to 400 times greater rates of production).

The use of high dielectric compositions may also have other advantages. For instance, some such compositions can make use of highly polar compounds that are not strongly influenced by local temperature or humidity conditions during the spinning process. The resulting fibers and particles made using dielectrophoretic spinning can have high temperature resistance, high solvent resistance, can be extremely hydrophobic, and could in some cases be used to produce superhydrophobic surfaces.

Moreover, such compositions may be generally nontoxic and of low flammability making them safe to handle during manufacturing.

These compositions may also eliminate or at least reduce some problems associated with orifice clogging and cleaning in conventional electrospinning equipment.

In some cases, the resulting fibers or particles can be controlled and directed to a counter-electrode in a manner similar to electrostatic coating of paints. However, in many cases, dielectrophoretic spinning can be done in open air using a "monopolar" source where there is no immediately apparent counter electrode. In such cases, the fibers could be released into a surrounding airstream, entrained within this moving airstream, and directed to be compiled onto a screen or wire in a manner similar to a common air laid process. There may be no need for elaborate fiber separation as the fibers will generally be in the form of a loose cloud.

In one exemplary embodiment, poly(vinylidene fluoride) (PVDF) may be used as an example of a high dielectric polymer, with a dielectric constant of roughly 8-12 (in contrast, most polyolefins or polystyrene have significantly lower dielectric constants of roughly 2-3). The PVDF resin can be dissolved within a solvent system that includes one or more high dielectric solvents, such as dimethyl sulfoxide (DMSO) or other co-solvents. The solvent/polymer mixture can be further enhanced by the addition of a high dielectric additive, such as solid powder 50 nanometer barium titanate crystals (with a dielectric constant of around 1750).

The resulting high dielectric composition can be fed through a glass pipette with a 1 mm orifice and with a submerged wire within the composition (sustained at a distance from the opening of the pipette). Applying a voltage between this submerged electrode and a suitable counter electrode at a distance D from the opening can result in particles that are attenuated from the orifice and form into small (particularly sub-micronic) particles.

Turning now to FIGS. 1 and 2, illustrated therein is a schematic representation of an apparatus 10 for forming particles using high dielectric compositions according to one embodiment.

The apparatus 10 generally includes at least one rotating surface, which in this embodiment is a rotating disk 12 with an upper surface 14. The apparatus 10 also includes a feed chamber or dispenser 16. As shown, the dispenser 16 is generally at or near the center of the disk 12 (e.g., at the axis of rotation A of the disk 12) and serves as a source for the liquid composition used to feed the apparatus 10.

In particular, a composition or mixture of high dielectric polymer and high dielectric solvent (indicated generally as M) may be deposited from the dispenser 16 onto the surface 14 of disk 12 generally at the axis of rotation A. The deposited mixture M will then flow outwardly across the disk surface 14, generally as a thin film, due to the centrifugal forces generated by rotation of the disk 12.

Under the appropriate operating conditions (e.g., rotational speeds, mixture feed rates, etc.), upon reaching the edge 18, the liquid mixture M will separate from the surface 14 of the disk 12 to form particles (indicated generally as P). These particles P may include fibers (e.g. filaments, ligaments, fibrils, etc.), droplets, or particles of various other shapes and sizes.

An electrostatic field is applied to these particles P to further attenuate them. For example, an electrostatic field may be generated between the disk 12 and a collector plate 20 positioned below the disk 12. Due to the electrostatic field, and when the liquid mixture M has suitable properties, the particles P ejected from the disk 12 will attenuate within the electrostatic field so as to further reduce in size.

For example, particles P may be ejected from the disk 12 with a size greater than one micron in diameter (e.g., greater than one micron but generally less than fifty microns), and then be further attenuated by the electrostatic field due to dielectrophoretic forces to achieve diameter of less than one micron.

The particles P will normally be drawn down by the electrostatic field and deposit on a top surface of the collector plate 20, in some cases forming a particle mat T on the collector plate 20.

In some embodiments, an estimate of the electrostatic field strength for the apparatus 10 may be indirectly determined by a voltage-distance quotient, shown here as the disk-to-collector distance DCD between the collector plate 20 and the disk 12. However, this appears to be less important in dielectrophoretic spinning as the forces that are dominant are the non-uniform electric field near the space where the fiber is formed. The presence of a counter-electrode may thus be almost unimportant.

In some cases the heated air can help heat the disk 12 or dispenser 16 (or both) to maintain the mixture M in a desired liquid state and more particularly at a temperature and viscosity that encourages the formation of small and stable particles P that separate from the edge 18 of the disk 12.

Turning now to FIG. 3, illustrated therein is another apparatus 100 for producing particles using a high dielectric composition according to another embodiment. The apparatus 100 generally includes a nozzle 102 (i.e., the emitter) with an orifice 104 at its distal end, and which is configured to emit the high dielectric composition.

The nozzle 102 is supported by an insulating stand 106 or other suitable structure that electrically isolates the nozzle 102 from its surroundings. In some embodiments, the nozzle 102 may be made from more electrically insulating materials such as glass, plastic, polytetrafluoroethylene (PTFE), nylon, or other suitable insulating material that is also chemically compatible with the high dielectric composition. In some embodiments, a conducting nozzle material may also be suitable.

In some cases, the nozzle 102 can act as a reservoir for the high dielectric composition, or can communicate with a fluid reservoir that stores the high dielectric composition. In some embodiments, multiple nozzles 102 can be employed although only one nozzle 102 is shown here for clarity.

In general, the orifice 104 can be configured so as to provide a suitable level of hydrodynamic resistance to the flow of the composition to obtain a desired composition feed rate.

In some embodiments, flow of fluid through the nozzle 102 can be driven by gravity (e.g., by arranging for a suitable fluid head above the nozzle orifice 104), or flow can be driven by a pump (e.g., a syringe pump) or other flow-regulating device.

In some embodiments, a capillary tube (e.g., a PTFE capillary tube) can be inserted into the nozzle 102 so that one end of the capillary tube restricts the flow at the orifice 104 and the other end of the capillary tube communicates with the interior of the nozzle 102 or with a fluid reservoir. The dielectrophoretic forces experiences at the nozzle tip draw fluid out of the nozzle 102 and can therefore act as a pump.

During use, a power supply 110 applies a voltage to the fluid composition, for example through an insulated or shielded cable 112 and an electrode 114 that may be immersed in the fluid composition (e.g., within the nozzle 102), usually at a significant distance from the orifice 104.

During use, when a suitable fluid composition is exposed to a sufficient voltage, particles will be emitted from the orifice 104 and drawn down by an electrostatic field and deposited on a top surface of a collector plate 130. Generally as with the apparatus 10, dielectrophoretic forces acting on the particles will attenuate the particles down to a desired size, in some cases sub-micronic sizes.

Figure 1:
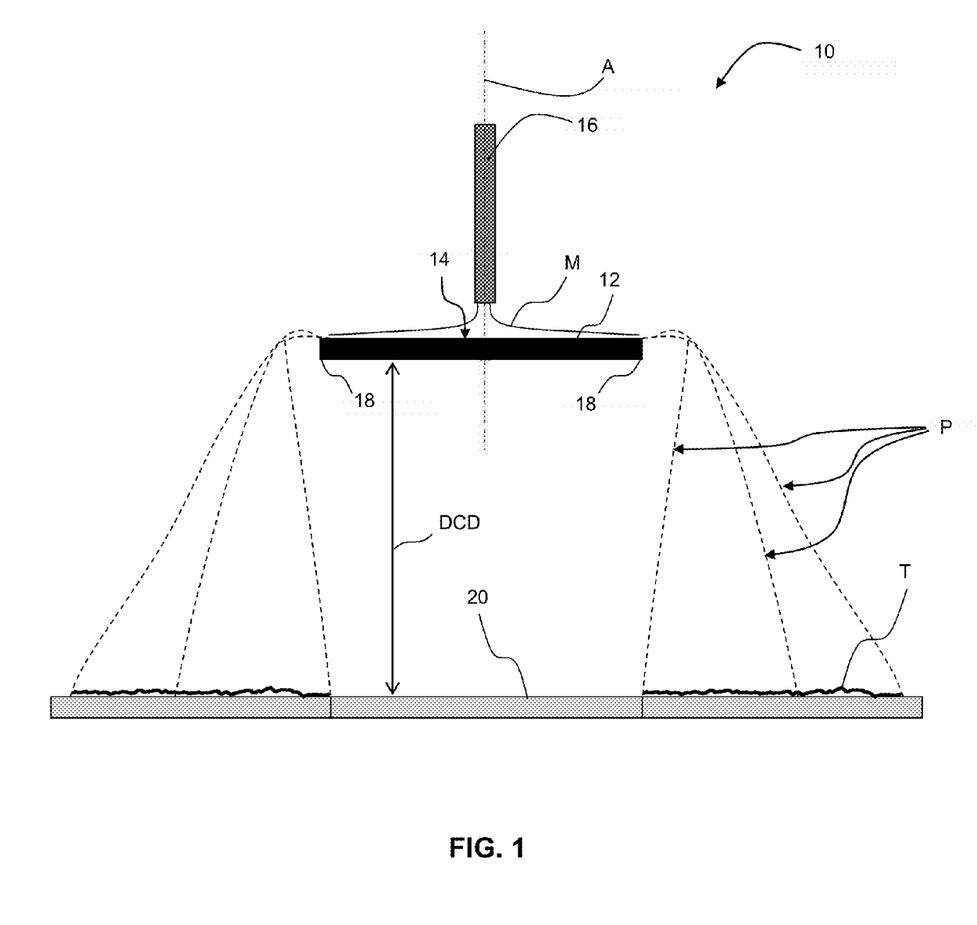
FIG. 1 is a schematic diagram illustrating a side view of an apparatus for forming particles according to one embodiment.
Figure 2:
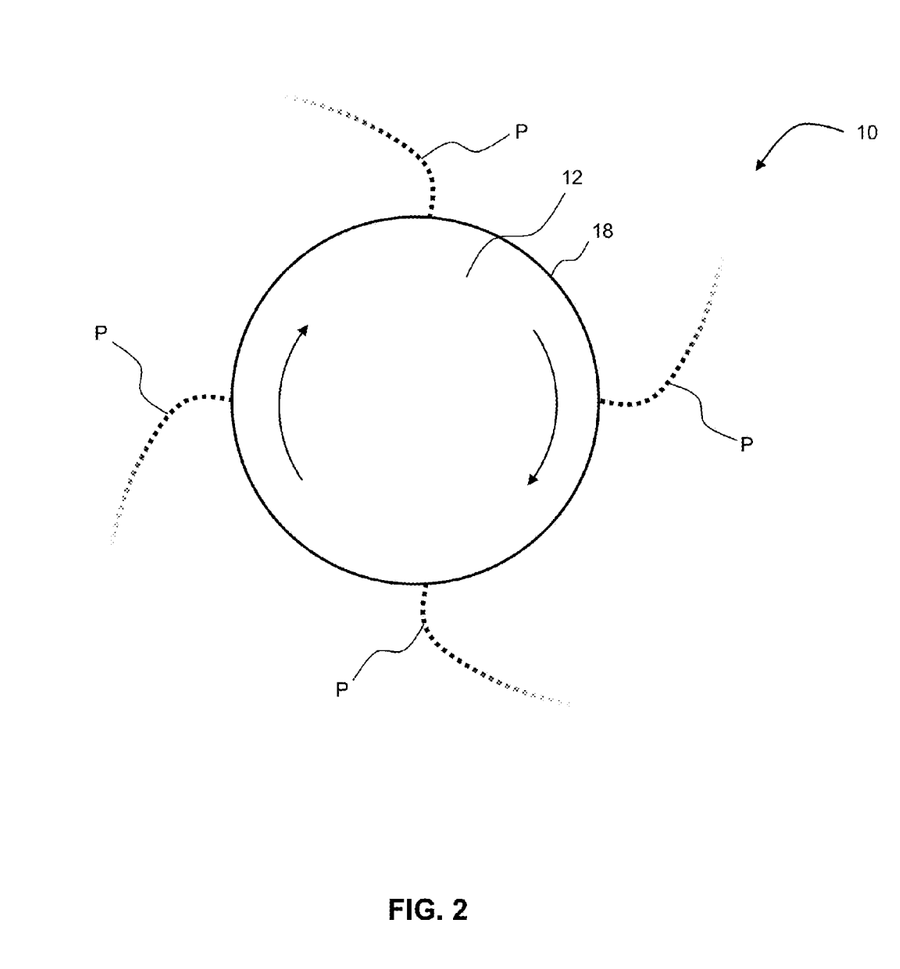
FIG. 2 is a top view of a rotating disk of the apparatus of FIG. 1.
Figure 3:
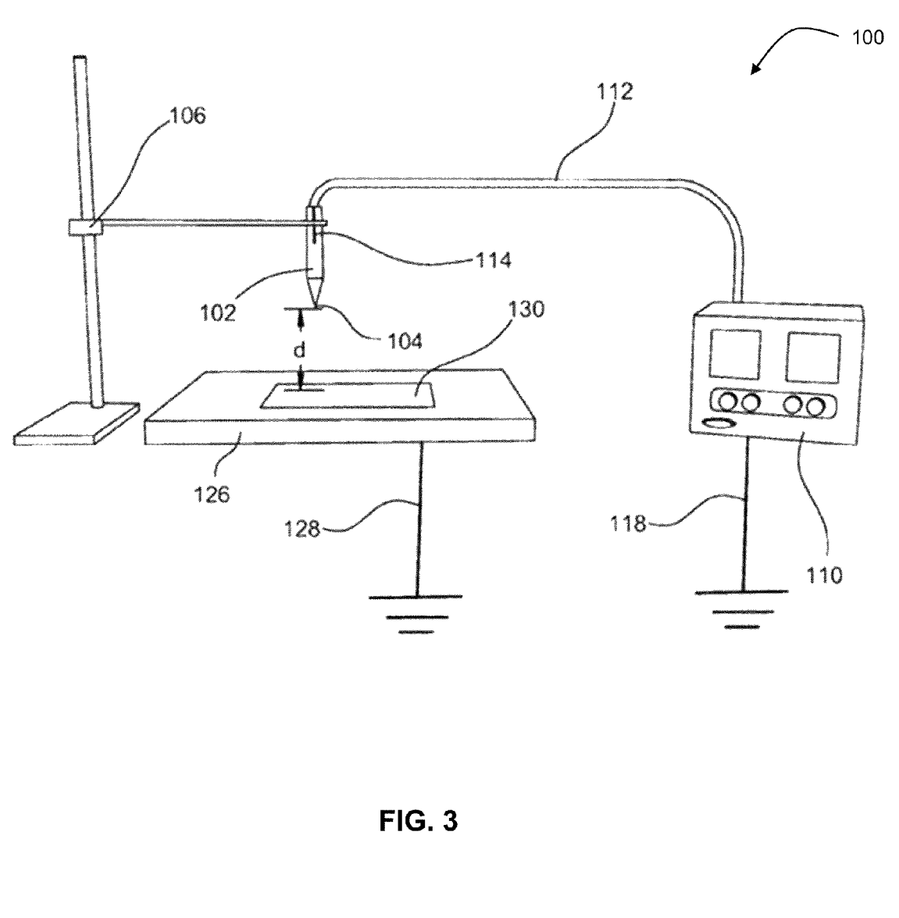
FIG. 3 is a schematic diagram illustrating an apparatus for forming particles according to another embodiment.

The arrangement of the apparatus 100 illustrated in FIG. 3 includes a surface 126 that is grounded through a ground connection 128 that is not directly connected to ground connection 118 of the power supply 110. It will of course be appreciated that other configurations for the apparatus 100 are possible.

EXPERIMENTS

General Comments

As discussed in further detail below, various experiments were conducted by exposing different compositions to an electrostatic field and observing the resulting particle sizes. Specifically, experiments were conducted to observe the performance of several high dielectric compositions that included a high dielectric polymer poly(vinylidene fluoride-co-hexafluoropropylene) [P(VDF-HFP)] in dielectrophoretic spinning processes. For simplicity, P(VDF-HFP) will simply be referred to as PVDF. These experiments were performed using an apparatus generally similar to the apparatus 100 described with reference to FIG. 3 above using an applied voltage of −37.5 kV and a distance d of 9 cm.

A relative assessment of each dielectrophoretic spinning experiment was performed by comparing observed results (e.g., fiber output measured in grams per hour (g/h), fiber size, the nature and/or characteristics of particle formation, etc.).

In some cases, a composition with high dielectric materials may be considered to be relatively more effective at producing fibers if the resulting fiber output (g/h) is greater and/or the fiber size is generally smaller than that obtained from another composition.

It was believed that PVDF would perform well in the presence of an electrostatic field since PVDF has a relatively high dielectric constant for a polymer and thus should be highly influenced by dielectrophoretic forces. Specifically, the dielectric constant $\in_r$ for PVDF is between about 8 and 12.

The PVDF was dissolved in a high dielectric constant solvent that included at least some dimethyl sulfoxide (DMSO). DMSO is an effective solvent that dissolves a wide variety of chemical compounds, including PVDF. DMSO also has a low toxicity and is not flammable. DMSO also has a relatively high dielectric constant ($\in_r \approx 47$), which suggests that it would be highly influenced by dielectrophoretic forces.

Initial experiments were aimed at determining if a composition that included PVDF dissolved in DMSO would be suitable to achieve good particle sizes and production rates.

Subsequent experiments then looked at whether the introduction of high dielectric additives, such as barium titanate ($BaTiO_3$, $\in_r \approx 1750$) would improve the results (e.g., higher fiber output, smaller fiber size, etc.)

Additional experiments with other solvents, surfactants, and variations in the percentages of PVDF were also undertaken to investigate the effect of varying dielectric constants, viscosity, surface tension, fiber diameter, fiber output, and formation of sprays, droplets, and/or wet fibers.

For reference, Table 1 lists various substances discussed along with their associated dielectric constants, vapor pressures, and boiling points.

TABLE 1

Properties of Various Substances

| Substance | Dielectric Constant | Vapor Pressure (mm · Hg) | Boiling Point (° C.) |
|---|---|---|---|
| DMSO | 47 | 0.084 | 189 |
| Acetone | 21 | 30.8 | 56 |
| methyl ethyl ketone (MEK) | 19 | 12.9 | 80 |
| butyl acetate (BuAc) | 5 | 1.66 | 126 |
| iso-propyl acetate (i-PrAc) | ~6 | 7.88 | 88 |
| water ($H_2O$) | 80 | 3.17 | 100 |
| Polyglycerol-3 | 30 | (low) | (higher than 100) |
| $BaTiO_3$, | 1750 | — | — |

Experiment 1: A K2850-04 in DMSO Solution

In a first experiment, four tests (1a through 1d) were conducted using a P(VDF-HFP) co-polymer called K2850-04 dissolved in a DMSO solution. K2850-04 is a Kynar Flex product produced by Arkema Inc. (King of Prussia, Pa., USA).

The concentration of K2850-04 was increased from 15 wt % to 21 wt % in increments of 2%. Fibers were obtained from each test, and observations are presented in Table 2:

TABLE 2

K2850-04 in DMSO solution

| Test ID | Composition | Average Fiber Diameter [nm] |
|---|---|---|
| 1a | 15% K2850-04 85% DMSO | 245 ± 96 |
| 1b | 17% K2850-04 83% DMSO | 329 ± 111 |
| 1c | 19% K2850-04 81% DMSO | 410 ± 117 |
| 1d | 21% K2850-04 79% DMSO | n/a |

A significant amount of wet spray was observed for the first test, and the fibers that did form contained "beads-on-a-string" formations. For the tests reported in experiment 1, poor fiber quality resulted in an inability to quantify the fiber output. The K2850-04 concentration was then increased to 17 wt % in an attempt to increase the viscosity of the solution and eliminate bead formation. The qualitative fiber output and amount of spray was similar with 15 wt %

K2850-04, although the K2850-04 crystallized more readily making the mixture more difficult to handle.

Increasing the K2850-04 concentration to 19 wt % resulted in a lower fiber output and produced more droplets and spray.

The formulation with 21 wt % K2850-04 resulted in no fibers visible to the eye. The 21 wt % K2850-04 formulation was too viscous to spin well and also crystallized easily and quickly. Qualitatively, the fiber output was lower and there was more spray than for the formulation with 19 wt % K2850-04. Furthermore, the increase in K2850-04 above 19 wt % did not eliminate the formation of beads.

Experiment 2: Solution with High-Dielectric $BaTiO_3$ Additive

For the second experiment barium titanate ($BaTiO_3$) was added to the composition (0.5 wt %) as a high-dielectric additive. Four tests (2a through 2d) were conducted, with two tests 2a and 2b with a K2850-04 concentration of 15%. These resulting observations are presented in Table 3:

TABLE 3

Solution with high dielectric $BaTiO_3$ additive

| Test ID | Composition | Fiber Output (g/hr) | Average Fiber Diameter [nm] |
|---|---|---|---|
| 2a | 15% K2850-04<br>84.5% DMSO<br>0.5% $BaTiO_3$ | 0.32 | 242 ± 145 |
| 2b | 15% K2850-04<br>84.5% DMSO<br>0.5% $BaTiO_3$ | 4.71 | 278 ± 95 |
| 2c | 17% K2850-04<br>82.5% DMSO<br>0.5% $BaTiO_3$ | n/a | 280 ± 68 |
| 2d | 19% K2850-04<br>80.% DMSO<br>0.5% $BaTiO_3$ | n/a | n/a |

The fiber output increased for a mixture with $BaTiO_3$ (2b) relative to the mixture without $BaTiO_3$ (1a), which is consistent with the very high dielectrophoretic forces that would be acting on the barium titanate particles. It was possible to remove the PTFE insert from the nozzle and increase the solution flow rate (2b) while preserving an average fiber size around 250 nm.

Of particular interest, the increased fiber output (2b) was high in comparison to the output observed in low dielectric spinning reported by Scott et al., which is believed to be correlated to the positive effects of the high dielectric constant of the PVDF polymer.

The K2850-04 concentration was increased in test 2c to determine the effect of increased resin loading.

At 17 wt % K2850-04, the viscosity increased slightly and qualitatively, and the fiber output dropped slightly.

Increasing the K2850-04 concentration up to 19 wt % (in test 2d) raised the viscosity sufficiently high such that that the solution was not spinnable and did not produce particles. Accordingly, a K2850-04 concentration of around 15 wt % to 17 wt % may be a good operating range for high dielectric compositions with DMSO and $BaTiO_3$.

The $BaTiO_3$ also delays the time required for the K2850-04 to crystallize, which causes the mixture to change to a solid-like gel. The formation of the gel is reversible, and a liquid state is achievable by heating and stirring the mixture. This reversibility property is true for all formulations that follow.

Experiment 3: DMSO and Acetone Solvents

The third experiment included two tests, 3a and 3b, and involved dissolving the polymer in a solvent mixture that included both DMSO and acetone. The first test 3a was conducted without the high-dielectric additive, barium titanate $BaTiO_3$, while the second test 3b added the high-dielectric additive. Observations for this experiment are presented in Table 4:

TABLE 4

DMSO and Acetone Solvents

| Test ID | Composition | Fiber output (g/hr) | Average Fiber Diameter [nm] |
|---|---|---|---|
| 3a | 15% K2850-04<br>42.5% DMSO<br>42.5% Acetone | 2.89 | 1029 ± 335 |
| 3b | 18.46% K2850-04<br>48.75% DMSO<br>32.5% Acetone<br>0.29% $BaTiO_3$ | 5.64 | 708 ± 314 |

The addition of acetone, a solvent with a dielectric constant ($\in_r \approx 21$) less than DMSO ($\in_r \approx 47$) positively increased the fiber output and reduced the amount of spray produced during spinning. The reduction in spray may be attributable to the higher vapor pressure and lower boiling point of acetone in comparison to DMSO.

The increase in fiber output may be related to the addition of a dielectric material with a dielectric constant in between the dielectric constant of DMSO and PVDF. In addition, it is suspected that the addition of the moderate dielectric material also reduces the bulk viscosity of the mixture such that it improves the spinnability of the mixture.

However, one observed effect of adding acetone to the composition was a corresponding increase in fiber size. Thus, while the acetone helped eliminate beads, it also simultaneously appears to increase the fiber size. This may be due to the acetone evaporating early in the spinning process, resulting in increased viscosity of the composition prior to the formation of the fibers and thus reducing the amount of fiber attenuation. This may also be due to the composition having a lower overall dielectric constant, and thus being less affected by dielectrophoretic forces.

Acetone also further delays the time required for the K2850-04 to crystallize.

Experiment 4: DMSO and MEK Solvents

In an attempt to reduce the fiber size, but maintain the fiber output and maintain or further reduce the spray, other dielectric solvents were selected as alternatives to acetone in this experiment. The selected solvents have slightly higher boiling points and moderate vapor pressures, and are known to dissolve PVDF.

Methyl ethyl ketone (MEK) may be desirable since it has similar solvating properties as acetone and is less expensive than DMSO. Furthermore, the vapor pressure of MEK is lower and the boiling point is higher than acetone, which should result in a slower evaporation of MEK during the spinning process, culminating in fibers with a smaller diameter.

Experiment 4 included nine tests, 4a through 4i, using a solvent mixture that combined DMSO and MEK. For the first test 4a, no $BaTiO_3$ was used. For tests 4b through 4f, concentrations of K2850-04 and $BaTiO_3$ were held somewhat constant while concentrations of DMSO and MEK were varied. In the remaining tests, 4g through 4i, K2850-04 content was decreased. Observations for this experiment are presented in Table 5:

TABLE 5

DMSO and MEK Solvents

| Test ID | Composition | Fiber output (g/hr) | Average Fiber Diameter [nm] |
|---|---|---|---|
| 4a | 49.2% DMSO<br>32.8% MEK<br>18% PVDF | 3.8 | 597 ± 200 |
| 4b | 49.03% DMSO<br>32.68% MEK<br>18% K2850-04<br>0.29% BaTiO$_3$<br>(60:40 DMSO/MEK) | 5.75 | 800 ± 209 |
| 4c | 40.79% DMSO<br>40.79% MEK<br>18.13% K2850-04<br>0.29% BaTiO$_3$<br>(50:50 DMSO/MEK) | 3.86 | 949 ± 135 |
| 4d | 32.63% DMSO<br>48.95% MEK<br>18.13% K2850-04<br>0.29% BaTiO$_3$<br>(40:60 DMSO/MEK) | 6.48 | 720 ± 256 |
| 4e | 24.47% DMSO<br>57.11% MEK<br>18.13% K2850-04<br>0.29% BaTiO$_3$<br>(30:70 DMSO/MEK) | 7.16 | 877 ± 223 |
| 4f | 16.32% DMSO<br>65.27% MEK<br>18.13% K2850-04<br>0.29% BaTiO$_3$<br>(20:80 DMSO/MEK) | 4.32 | 940 ± 474 |
| 4g | 25.1% DMSO<br>58.6% MEK<br>16% K2850-04<br>0.3% BaTiO$_3$ | 1.492 | 449 ± 83 |
| 4h | 25.71% DMSO<br>59.99% MEK<br>14% K2850-04<br>0.3% BaTiO$_3$ | 2.376 | 467 ± 136 |
| 4i | 26.3% DMSO<br>61.4% MEK<br>12% K2850-04<br>0.3% BaTiO$_3$ | n/a | n/a |

In comparing the formulations without BaTiO$_3$, the MEK formulation of test 4a demonstrated a decrease in fiber diameter and an increase in fiber output in contrast to the corresponding acetone formulation of test 3a. The higher boiling point and lower vapor pressure of MEK may contribute to a reduction in evaporation during the early spinning stages and a lower viscosity solution that produces smaller diameter fibers. The lower viscosity may also lead to the slightly higher fiber output.

The addition of BaTiO$_3$ to the MEK mixture (test 4b) again resulted in an increase in fiber output, while the fiber diameter also decreased in comparison to the acetone formulation of test 3b.

The MEK/BaTiO$_3$ composition appeared to provide for good fiber production rates and good fiber sizes. Additional experiments (4d-4f) were carried out to determine if the DMSO concentration could be lowered to reduce the cost of the formulation and possibly further improve the spinning properties by having a higher concentration of more readily evaporative solvent in comparison to DMSO.

Once the DMSO concentration is lowered to 20:80 DMSO/MEK (test 4f), the spinning performance drops, perhaps because there is not a sufficient amount of DMSO present.

The fiber diameter does not seem to change dramatically with the increased amount of MEK. The greater the concentration of MEK, the more porosity is present in the fiber due to the larger contrast between the readily evaporative MEK and the low vapor pressure DMSO.

Decreasing the PVDF concentration from 18 (4e) to 14-16 (4g & 4h) wt % reduced the mixture viscosity and reduced the fiber size. A further reduction in PVDF concentration (4i) resulted in a mixture viscosity that was too low to support fiber formation.

Experiment 5: Alternatives to MEK and Acetone

A series of other alternative dielectric solvents (aside from MEK) were selected as other possible alternatives to acetone. The selected solvents had slightly higher boiling points and lower vapor pressures, and were known to dissolve or swell PVDF. The observations of Experiment 5 are provided in Table 6:

TABLE 6

Alternatives to MEK and Acetone

| Test ID | Composition | Fiber output (g/hr) | Average Fiber Diameter [nm] |
|---|---|---|---|
| 5a | 49.03% DMSO<br>32.68% BuAc<br>18% K2850-04<br>0.29% BaTiO$_3$ | 2.83 | 406 ± 117 |
| 5b | 49.03% DMSO<br>32.68% i-PrAC<br>18% K2850-04<br>0.29% BaTiO$_3$ | 4.87 | 466 ± 171 |

The results reported in Table 6 suggests the lower vapor pressures of BuAc and i-PrAc result in less evaporation during spinning than MEK and as a result there is less viscosity change culminating in smaller diameter fibers. The lower dielectric constants of BuAc and i-PrAc likely limit the fiber production rate.

Experiment 6: Surfactants

In Experiment 6, a surfactant was added to the composition to determine if the beads on the fiber could be eliminated or at least reduced by reducing the surface tension of the mixture.

It was also theorized that the addition of a surfactant might assist in stabilizing the dispersion of BaTiO$_3$, which might improve the fiber spinning properties. Two tests were conducted, 6a and 6b.

In the first test 6a, DMSO and acetone were combined as the solvent, and BDP-MB-1 produced by BDP Innovative Chemicals Inc. (Orlando, Fla., USA) was used with water as a surfactant.

In the second test 6b, DMSO, MEK, and BuAc were combined as the solvent, and BaTiO$_3$ was added, with Zephrym PD 2234-NV-LQ-(AP) (Zpm) (Croda International Plc, East Yorkshire, UK) as a surfactant. The observations are shown in Table 7:

TABLE 7

Surfactants

| Test ID | Composition | Fiber output (g/hr) | Average Fiber Diameter [nm] |
|---|---|---|---|
| 6a | 47.1% DMSO<br>31.4% Acetone<br>18.1% K2850-04<br>1.2% BDP-MB-1 solids<br>1.8% H$_2$O | n/a | 482 ± 116 |
| 6b | 12.24% DMSO<br>57.12% MEK<br>12.24% BuAc<br>18% K2850-04<br>0.3% BaTiO$_3$<br>0.1% Zpm | n/a | n/a |

It was noted that bead formation appeared to be eliminated in test 6a, perhaps due to a decrease in surface tension. The fiber output was qualitatively low in comparison to the acetone formulation without BDP. In addition, the conductivity of the mixture is increased when adding ionic surfactants, which may cause a loss of dielectrophoretic forces.

Experiment 7: Polyglycercol-3 Investigation

Polyglycerol-3 (PG-3) was introduced since it has a relatively high dielectric constant ($\in_r \approx 30$). A mixture with 5% PG-3 as shown in Table 8, produced fibers. The fiber output was quite high, comparable to the corresponding formulation without PG-3. However the fiber diameter increased significantly.

TABLE 8

Polyglycerol-3

| Test ID | Composition | Fiber output (g/hr) | Average Fiber Diameter [nm] |
|---|---|---|---|
| 7a | 20% DMSO<br>56.7% MEK<br>5% PG-3<br>18% K2850-04<br>0.3% BaTiO$_3$ | 7.2 | 1487 ± 340 |

Additional Discussion

Based on the experiments conducted, several conclusions may be drawn.

It would appear a high dielectric polymer (K2850-04) dissolved in a high dielectric solvent (DMSO) does show promise in improving the production rates of small particles.

The addition of a high dielectric constant additive (e.g., ceramic BaTiO$_3$ nanoparticles) also appears to have positive effects on fiber output and production rates.

Adding a solvent with an intermediate dielectric constant (e.g., acetone) between the dielectric constants of the polymer (K2850-04) and main solvent (DMSO) may improve fiber output, but at the expense of fiber diameter.

It is believed that various other high dielectric additives could be suitable for improving particle production rates or decreasing particle sizes, or both. Examples of other dielectric materials that might be suitable as additives are listed in Table 10:

TABLE 9

| Alternative Dielectric Additive Materials | |
|---|---|
| Material | Dielectric constant (approx.) |
| Ionic liquids | 10-15 |
| Polycaprolactone | |
| Polyglycerol | 30 |
| Glycerol | 40 |
| Calcium copper titanate (CCTO | 100,000-200,000 (approx.) |
| Lanthanum strontium nickelate nanopowder (<100 nm) | 100,000 (approx.) |
| Samarium oxides | >2500 |
| Lanthanum oxides | >2500 |
| Strontium oxide | >2500 |
| Nanopowders of metal, metal oxides, bi-metal oxides, multi-metal oxides | >100 |
| Titanium dioxide ($TiO_2$) | 86-173 |
| Core-shell nanoparticles | |
| Conjugated polymers | >20, possibly up to 100,000 |
| Liquid crystals | >100 |

It is also believed that various other polymers may have sufficiently high dielectric constants so as to be suitable for the compositions and methods described herein. For example, polyurethane ($\in_r \approx 6.30$), phenolic ($\in_r \approx 6.50$-17.50), and Kynar (PVDF) ($\in_r \approx 8.4$), and Tedlar PVF film, made by DuPont have high dielectric constants and may be suitable. In addition, vinylidene fluoride co- and ter-polymers have a very high dielectric constant ($\in_1 \approx 10$-70).

In general, the high dielectric composition should be selected to encourage dielectrophoretic attenuation within an electrostatic field (e.g., during dielectrophoretic spinning) when the base compound is in a liquid form.

In some embodiments, the high dielectric polymer could have a dielectric constant above 5, a dielectric constant above 10 or a dielectric constant above 20.

In some embodiments, the high dielectric solvent could have a dielectric constant above 10, a dielectric constant above 20 or a dielectric constant above 40.

In some cases, the dielectric additive may have a dielectric constant above 100, above 1000 or above 100,000.

While the above description provides examples of one or more apparatus, methods, or compositions, it will be appreciated that other apparatus, methods, or compositions may be within the scope of the present description as interpreted by one of skill in the art.

The invention claimed is:

1. A system for particle formation, comprising:

a) a high dielectric composition comprising a high dielectric solvent having a dielectric constant of at least 15;

a high dielectric polymer dissolved into the high dielectric solvent, the polymer having a dielectric constant of at least 5; and a high dielectric additive dispersed within the composition, the additive having a dielectric constant of at least 100;

wherein the polymer concentration is between about 10 wt % and 25 wt % of the composition; and b) a particle formation apparatus for forming particles using the high dielectric composition.

2. The system of claim 1 wherein the high dielectric polymer has a dielectric constant greater than 8.

3. The system of claim 1 wherein the high dielectric polymer has a dielectric constant between 10 and 12.

4. The system of claim 1 wherein the high dielectric solvent has a dielectric constant of at least 40.

5. The system of claim 1 wherein the high dielectric additive has a dielectric constant of at least 50.

6. The system of claim 1 wherein the high dielectric additive has a dielectric constant of at least 1000.

7. The system of claim 1 wherein the solvent includes dimethyl sulfoxide (DMSO).

8. The system of claim 1 wherein the solvent includes acetone.

9. The system of claim 1 wherein the solvent includes methyl-ethyl-ketone (MEK).

10. The system of claim 1 wherein the high dielectric additive includes at least one of:
    a) polyglycol;
    b) glycol;
    c) mannitol;
    d) ionic liquid;
    e) polyglycerol;
    f) glycerol;
    g) titanium dioxide;
    h) barium titanate;
    i) calcium copper titanate (CCTO)
    j) lanthanum strontium nickelate nanopowder;
    k) samarium oxides;
    l) samarium titanates;
    m) lanthanum oxides;
    n) lanthanum titanates;
    o) strontium oxide;
    p) strontium titanates;
    q) nanopowders of metal, bi-metal, and multi-metal oxides or titanates;
    r) metals;
    s) surface functionalized nanoparticles;
    t) metal nanoparticles with an organic coating;
    u) iron carbonyl;
    v) conjugated polymers;
    w) liquid crystals; and
    x) nano-particles of metals including one or more of nickel, silver, aluminum, gold, transition metals including manganese, cobalt, and alloys including stainless steel.

11. The system of claim 1 wherein the high dielectric additive is dispersed within the composition using a dispersing agent.

12. The system of claim 1 wherein the solvent includes at least one of:
    a) acetone;
    b) acetonitrile;
    c) acetophenone;
    d) acetyl chloride;
    e) acrylonitrile;
    f) gamma-butyrolectone;
    g) cyclohexanone;
    h) N,N-dimethylacetamide;
    i) N,N-dimethylformamide;
    j) dimethylsulfoxide;
    k) 1,4-dioxane;
    l) ethylene glycol;
    m) ethyl formate;
    n) formamide;
    o) formic acid;
    p) methanol;
    q) methyl ethyl ketone;
    r) N-methyl-2-pyrrolidone;
    s) nitromethane;
    t) 2-nitropropane;
    u) propylene-1,2-carbonate;
    v) tetrahydrofuran;
    w) tetramethylurea;
    x) triethyl phosphate; and
    y) trimethyl phosphate.

13. The system of claim 1, wherein the polymer includes at least one of:
    a) PVDF;
    b) PVDF co- and ter-polymers;
    c) polyurethane;
    d) phenolic;
    e) PVF film;
    f) vinylidene fluoride-trifluoroethylene copolymer; and
    g) polycaprolactone.

14. A system for particle formation, comprising:
    a) a high dielectric composition comprising
        a high dielectric solvent; and
        a high dielectric polymer dissolved into the high dielectric solvent; and
        a high dielectric additive dispersed within the composition; and
    b) a particle formation apparatus for forming particles using the high dielectric composition;
        wherein the polymer includes at least one of: PVDF, PVDF co- and ter-polymers, polyurethane, phenolic, PVF film, vinylidene fluoride-trifluoroethylene copolymer, and polycaprolactone; and
        wherein the polymer concentration is between about 10 wt % and 25 wt %.

15. The system of claim 14 wherein the high dielectric polymer has a dielectric constant of at least 5.

16. The system of claim 14 wherein the high dielectric polymer has a dielectric constant greater than 8.

17. The system of claim 14 wherein the high dielectric polymer has a dielectric constant between 10 and 12.

18. The system of claim 14 wherein the high dielectric solvent has a dielectric constant of at least 15.

19. The system of claim 14 wherein the high dielectric solvent has a dielectric constant of approximately 40.

20. The system of claim 14 wherein the high dielectric additive has a dielectric constant of at least 50.

21. The system of claim 14 wherein the high dielectric additive has a dielectric constant of at least 100.

22. The system of claim 14 wherein the high dielectric additive has a dielectric constant of at least 1000.

23. The system of claim 14 wherein the solvent includes dimethyl sulfoxide (DMSO).

24. The system of claim 14 wherein the solvent includes acetone.

25. The system of claim 14 wherein the solvent includes methyl-ethyl-ketone (MEK).

26. The system of claim 14 wherein the high dielectric additive includes at least one of:
    a) polyglycol;
    b) glycol;
    c) mannitol;
    d) ionic liquid;
    e) polyglycerol;
    f) glycerol;
    g) titanium dioxide;
    h) barium titanate;
    i) calcium copper titanate (CCTO);
    j) lanthanum strontium nickelate nanopowder;

k) samarium oxides;
l) samarium titanates;
m) lanthanum oxides;
n) lanthanum titanates;
o) strontium oxide;
p) strontium titanates;
q) nanopowders of metal, bi-metal, and multi-metal oxides or titanates;
r) metals;
s) surface functionalized nanoparticles;
t) metal nanoparticles with an organic coating;
u) iron carbonyl;
v) conjugated polymers;
w) liquid crystals; and
x) nano-particles of metals including one or more of nickel, silver, aluminum, gold, transition metals including manganese, cobalt, and alloys including stainless steel.

27. The system of claim 14 wherein the high dielectric additive is dispersed within the composition using a dispersing agent.

28. The system of claim 14 wherein the solvent includes at least one of:
a) acetone;
b) acetonitrile;
c) acetophenone;
d) acetyl chloride;
e) acrylonitrile;
f) gamma-butyrolectone;
g) cyclohexanone;
h) N,N-dimethylacetamide;
i) N,N-dimethylformamide;
j) dimethylsulfoxide;
k) 1,4-dioxane;
l) ethylene glycol;
m) ethyl formate;
n) formamide;
o) formic acid;
p) methanol;
q) methyl ethyl ketone;
r) N-methyl-2-pyrrolidone;
s) nitromethane;
t) 2-nitropropane;
u) propylene-1,2-carbonate;
v) tetrahydrofuran;
w) tetramethylurea;
x) triethyl phosphate; and
y) trimethyl phosphate.

29. The system of claim 14, wherein the apparatus comprises a reservoir storing the high dielectric composition.

30. The system of claim 14, wherein the apparatus is in communication with a reservoir storing the high dielectric composition.

* * * * *